Sept. 29, 1925.
P. N. HANSEN
LAWN SHEARS ATTACHMENT
Filed Sept. 23, 1922
1,555,469
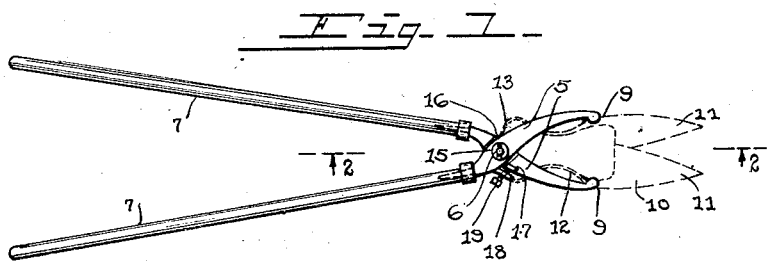
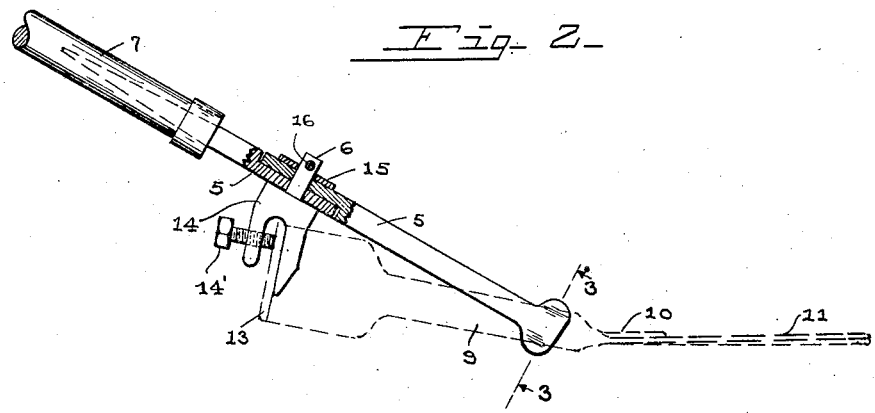
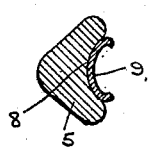
INVENTOR.
Peter N. Hansen —
BY Morsell and Keeney
ATTORNEYS.

Patented Sept. 29, 1925.

1,555,469

UNITED STATES PATENT OFFICE.

PETER N. HANSEN, OF MILWAUKEE, WISCONSIN.

LAWN-SHEARS ATTACHMENT.

Application filed September 23, 1922. Serial No. 590,151.

*To all whom it may concern:*

Be it known that I, PETER N. HANSEN, a citizen of the United States, and resident of Milwaukee, in the county of Milwaukee and State of Wisconsin, have invented new and useful Improvements in Lawn - Shears Attachments, of which the following is a description, reference being had to the accompanying drawings, which are a part of this specification.

This invention relates to improvements in lawn shear attachments.

It is one of the objects of the present invention to provide a law shear attachment which may be easily connected to the ordinary hand operated lawn shears to permit the use of the shears while the operator is in an erect position.

A further object of the invention is to provide a lawn shear attachment so constructed that when connected to a shears, the spring of the shears will automatically hold the handles of the attachment yieldingly in open position so that the handles need only be pressed inwardly to cut the grass.

A further object of the invention is to provide a lawn shear attachment which is of simple construction, is strong and durable, and is well adapted for the purpose described.

With the above and other objects in view, the invention consists of the improved lawn shear attachment, and its parts and combinations as set forth in the claims, and all equivalents thereof.

In the accompanying drawings in which the same reference characters indicate the same parts in all of the views:

Fig. 1 is a side view of the improved lawn shear attachment, the view also indicating by dotted lines a lawn shears engaged by the attachment;

Fig. 2 is a view on a larger scale taken at right angles to Fig. 1 and partly in section; and Fig. 3 is a transverse sectional detail view taken on line 3—3 of Fig. 2.

Referring to the drawing, the numeral 5 indicates a pair of levers which cross each other medially of their length and are connected together by a pivot pin 6. The outer ends of the levers extend into handles 7 which are of sufficient length to be used by the operator while in erect position. The inner ends of the levers are formed with inner curved faces 8 which are curved to correspond with the curved portions 9 of the lawn shears 10. Said shears are of the ordinary type and are provided with the shear portions 11, handle portions 12 of rounded form and a spring portion 13 which normally holds the shear blades in open position.

The pivot pin 6 is provided with a lower enlargement or head 14 of bifurcated form adapted to receive the upper edge portion of the spring part 13 of the shears and one of the bifurcated portions is provided with a bolt 14' to clamp the shears thereto in the manner shown in Fig. 2. A washer 15 is mounted on the pin 6 and a cotter pin 16 extending through the pivot pin maintains the levers pivotally in position.

To limit the outward movement of the shear blades, the levers are provided with lugs 17 and 18 and the lug 18 is provided with a bolt 19 which impinges against the lug 17 and clamps the parts together.

In use, it is only necessary to clamp the attachment to a pair of ordinary lawn shears in the manner shown, and then actuate the handles back and forth to operate the shears.

From the foregoing description, it will be seen that the lawn shear attachment is of very simple construction, and is well adapted for the purpose described.

What I claim as my invention is:

1. A lawn shear attachment, comprising a pair of crossed levers having handle portions at one end and shear engaging means at their other ends secured by the tension of the shear which, in its unattached normal condition, is at a greater spread at the portion engaged, than the end portions of the lever, and a member pivotally connecting the levers together and having means extending therefrom for connecting shears to the levers by clampingly engaging the inner and outer sides of the shear handle by means which firmly bear upon but do not penetrate the shear.

2. A lawn shear attachment, comprising a pair of levers having shear engaging end portions formed with concave inner surfaces secured by the tension of the shear which, in its unattached, normal condition, is at a greater spread at the portion engaged, than the end portions of the lever, and a pivotal connection for the levers provided with a shear clamping means extending therefrom for engaging the inner and outer sides of the shear handle by means which firmly bear upon but do not penetrate the shear, said levers being crossed and having the pivotal connection near their shear engaging end portions.

3. A lawn shear attachment, comprising a pair of crossed levers pivotally connected together and having long handle portions at one end and having the inner faces of the other ends curved to form shear engaging means secured by the tension of the shear, which, in its unattached normal condition, is at a greater spread at the portion engaged than the end portions of the lever, and other means spaced from the shear engaging means for connecting shears to the levers.

4. A lawn shear attachment, comprising a pair of crossed levers having handle portions at one end and shear engaging means at their other ends secured by the tension of the shear, which, in its unattached, normal condition, is at a greater spread at the portion engaged than the end portions of the lever, a pin member pivotally connecting the levers together, said pin member being formed with a bifurcated portion for securing therein the shears, and means for limiting the outward movement of the lever ends so that the distance between them at their engaging portions is less than the spread of the shear in its unattached normal condition, so thereby holds the shears firmly in position by the tension of said shears.

5. A lawn shear attachment, comprising a pair of crossed levers having handle portions at one end and shear engaging means at their other ends secured by the tension of the shear, which, in its unattached, normal condition, is at a greater spread at the portion engaged than the end portions of the lever, a pin member pivotally connecting the levers together, said pin member being formed with a bifurcated portion for releasably securing therein a portion of the shears and means for limiting the outward movement of the lever ends so that the distance between them at their engaging portions is less than the spread of the shear in its unattached normal condition, so thereby holds the shears firmly in place by the tension of said shears.

In testimony whereof, I affix my signature.

PETER N. HANSEN.